(12) United States Patent
Morris

(10) Patent No.: US 6,460,138 B1
(45) Date of Patent: Oct. 1, 2002

(54) USER AUTHENTICATION FOR PORTABLE ELECTRONIC DEVICES USING ASYMMETRICAL CRYPTOGRAPHY

(75) Inventor: Robert Paul Morris, Raleigh, NC (US)

(73) Assignee: Flashpoint Technology, Inc., Peterborough, NH (US)

( * ) Notice: Subject to any disclaimer, the term of this patent is extended or adjusted under 35 U.S.C. 154(b) by 0 days.

(21) Appl. No.: 09/166,344

(22) Filed: Oct. 5, 1998

(51) Int. Cl.$^7$ ................................................ H04L 9/30
(52) U.S. Cl. ...................................... 713/184; 713/168
(58) Field of Search ................................ 713/184, 168, 713/179, 170, 172, 176, 181, 193; 380/247

(56) References Cited

U.S. PATENT DOCUMENTS

| | | | | |
|---|---|---|---|---|
| 5,282,247 A | * | 1/1994 | McLean et al. | 711/164 |
| 5,293,424 A | * | 3/1994 | Hotley et al. | 713/193 |
| 5,499,294 A | * | 3/1996 | Friedman | 713/179 |
| 5,552,897 A | | 9/1996 | Mandelbaum | 358/400 |
| 5,778,072 A | | 7/1998 | Samar | 380/30 |
| 5,917,913 A | * | 6/1999 | Wang | 705/67 |
| 5,933,328 A | * | 8/1999 | Wallace et al. | 361/737 |
| 6,003,135 A | * | 12/1999 | Bialick et al. | 713/201 |
| 6,026,293 A | * | 2/2000 | Osborn | 455/411 |
| 6,038,549 A | * | 3/2000 | Davis et al. | 705/35 |
| 6,084,967 A | * | 7/2000 | Kennedy et al. | 380/247 |

FOREIGN PATENT DOCUMENTS

EP       1 017 223 A2 *   7/2000

OTHER PUBLICATIONS

An Introduction to Cyptography, Entrust Technologies, Dec. 1997 http://www.entrust.com/resources/pdf/cry.
Introduction to Public–Key Cryptography, Netscape, 9/2598 http://developer.netscape.com/docs/manuals.
Smartcard Invasion Continues, Byte, Apr. 1998 http://www.byte.com/art/9804/sec19/art1.htm.

* cited by examiner

*Primary Examiner*—Matthew Smithers
(74) *Attorney, Agent, or Firm*—Stephen G. Sullivan; Sawyer Law Group LLP

(57) ABSTRACT

A system and method for authenticating a user of a portable electronic device having a removable memory using asymmetric cryptography, the asymmetric cryptography requiring the use of a user'private key and public key. The method and system include storing the user'private key and public key on the portable electronic device. Thereafter, information including the user'personal identification number (PIN) is encrypted using the user'private key and public key, respectively, to create encrypted authentication information. The encrypted authentication information is then stored on a standard removable memory, such as a flash card. When the removable memory is subsequently inserted into the portable electronic device, the portable electronic device automatically decrypts the authentication information and prompts the user for a PIN code. If the decrypted authentication information and the entered PIN are verified, the user is authenticated without the use of a smart card or card reader and the device is unlocked allowing the user to gain access.

11 Claims, 3 Drawing Sheets

USER AUTHENTICATION FOR PORTABLE ELECTRONIC DEVICES USING ASYMMETRICAL CRYPTOGRAPHY

FIELD OF THE INVENTION

The present invention relates to the security of portable electronic devices, and more particularly to a method and system for the authentication of a user of a portable electronic device using asymmetrical cryptography.

BACKGROUND OF THE INVENTION

Security for most electronic devices dealing with sensitive data utilizes one or another form of a password (PIN or access code) to prevent unauthorized access. In order to use a device the user is requested to enter a password or pin. If correct, the user is allowed to use the device, if not, well he/she is usually just prompted to try again.

Password protection, however, has not proven to be a very effective means of user authentication due to two fundamental problems with passwords. If they are relatively short and easy to memorize, they may be easily compromised either through guessing (by unauthorized users) or broken using a simple password cracking program. Stronger protection is achieved through longer, meaningless or randomly generated passwords, but they are easy to forget (by authorized users). And in many portable electronic devices, the situation is even worse in the cases where passwords are stored in storage that requires batteries to keep it stable. An unauthorized user can simply remove the batteries and wait for the password to disappear.

An improved approach to providing security for electronic devices is to create long, invincible passwords using public-key cryptography, and to then store those passwords (digital keys) on smart cards. A Smart card is a plastic credit card that carries an imbedded chip instead of a magnetic stripe.

Public-key cryptography enables two communicating parties to disguise information they send to each other through encryption and decryption. Using the digital keys stored on the smart card, the sender encrypts, or scrambles, information before storing it on a smart card. The encrypted information on the smart card is unintelligible to an intruder. When the smart card is inserted into a smart card reader attached to the device to be accessed, the smart card reader decrypts, or unscrambles, the information. Access to the device is allowed once the information is verified.

Many of today'smart cards use asymmetric cryptographic algorithms. With this method, a public key is used in combination with a private key that is only used by the owner of the smart card. Typically, the private key is stored on the smart card, while the public key is stored within the protected electronic device. A message sent using these two keys can only be decoded using the complementary keys. Thus, anonymous and secure data transmission is attained using the public key and the data can only be read by the owner of the private key.

Before a user can own a smart card, the user must first obtain a certificate from a certificate authority. A certificate issued by the certificate authority binds a particular public key to the name of the person or entity the certificate identifies (such as the name of an employee). Certificates help prevent the use of fake public keys for impersonation. Only the public key certified by the certificate will work with the corresponding private key possessed by the person or entity identified by the certificate.

These public and private keys are used to authenticate the person by creating a digital signature for that person, which is then stored on the smart card along with the person's PIN. When the user inserts his/her smart card into a smart card reader to gain access to a particular device, the user is prompted for the PIN. If the PIN matches the PIN read from the card, the user's digital signature is then used to authenticate that the user is who he/she claims to be.

FIG. 1 is diagram illustrating a standard smart card protocol for creating and verifying a digital signature. A digital signature is created by running message text through a hashing algorithm. This yields a message digest. The message digest along with the message is then encrypted using the private key of the individual who is sending the message, turning it into a digital signature. The digital signature can only be decrypted by the public key of the same individual. The recipient of the message decrypts the digital signature to obtain the original message, and uses the original message to recalculate the message digest. The value of this newly calculated message digest is compared to the value of the message digest found from the digital signature. A match indicates that the message has not been tampered with. Since the public key of the sender was used to verify the signature, the text must have been signed with the private key owned by the sender.

This use of digital signatures is the emerging standard for user authentication and security in network environments. In theory, a person can use the same digital certificate to gain access to any number of services, rather than having to remember and manage a number of different passwords. Smart cards are not subject to tampering or forgery (provided the key is long enough). An unauthorized user would have to know the user's PIN and also have the user's digital certificate to gain access.

Unfortunately, there is problem with using smart cards to provide security for portable electronic devices because smart card readers are too bulky to be built in to such devices. For example, certain types of portable electronic devices, such as digital cameras and personal digital assistants, utilize removable memories that are even smaller than PCMCIA cards. One example of this type of memory is a compact flash card. One solution is to carry an external smart card reader around as a peripheral device and plug it into such a device when the user wishes to use the device. This, however, would be inconvenient and burdensome to the user. And simply storing a pin and a digital certificate on a removable memory compatible with the portable electronic device is not an acceptable alternative because of the risk of having the memory lost or stolen. This would allow a third party to gain access to the user's PIN and to impersonate the owner in any transaction where asymmetrical cryptography are used for authentication.

Accordingly, what is needed is a system and method for authenticating the user of a portable electronic device without the need of a smart card and reader. The present invention addresses such a need.

SUMMARY OF THE INVENTION

The present invention provides a method and system for authenticating a user of a portable electronic device having a removable memory using asymmetric cryptography, the asymmetric cryptography requiring the use of a user's private key and public key. The method and system include storing the user's private key and public key on the portable electronic device. Thereafter, information including the user's personal identification number (PIN) is encrypted using the user's private key and public key, respectively, to create encrypted authentication information. The encrypted authentication information is then stored on a standard removable memory, such as a flash card. Until the removable memory containing the correct authentication information is inserted into the device and the authentication information verified, the portable electronic device remains locked and inaccessible to all would be users.

When the removable memory is subsequently inserted into the portable electronic device, the portable electronic device automatically decrypts the authentication information using the private and public keys, respectively, and prompts the user for a PIN code. If the decrypted authentication information and the entered PIN are verified, the user is authenticated without the use of a smart card or card reader and the device is unlocked allowing the user to gain access.

According to the system and method disclosed herein, the present invention provides enhanced security for portable electronic devices while maintaining the devices's portability.

DETAILED DESCRIPTION OF THE INVENTION

The present invention relates to a method and system authenticating users of portable electronic devices using asymmetrical cryptography. The following description is presented to enable one of ordinary skill in the art to make and use the invention and is provided in the context of a patent application and its requirements. Although the present invention will be described in the context of a preferred embodiment, various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention uses asymmetrical cryptoghraphy and a PIN for user authentication in an electronic device. The present invention assumes that the user, preferrably the owner of the portable electronic device, first obtains a personal and public key from a given certificate authority.

Figure 1:
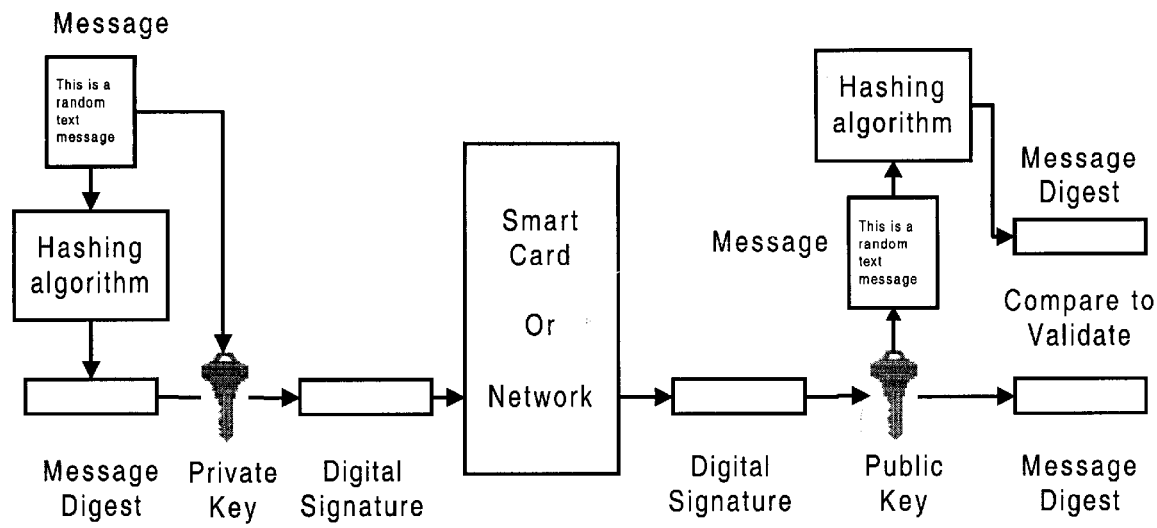
FIG. 1 is diagram illustrating a standard smart card protocol for creating and verifying a digital signature.
Figure 2:
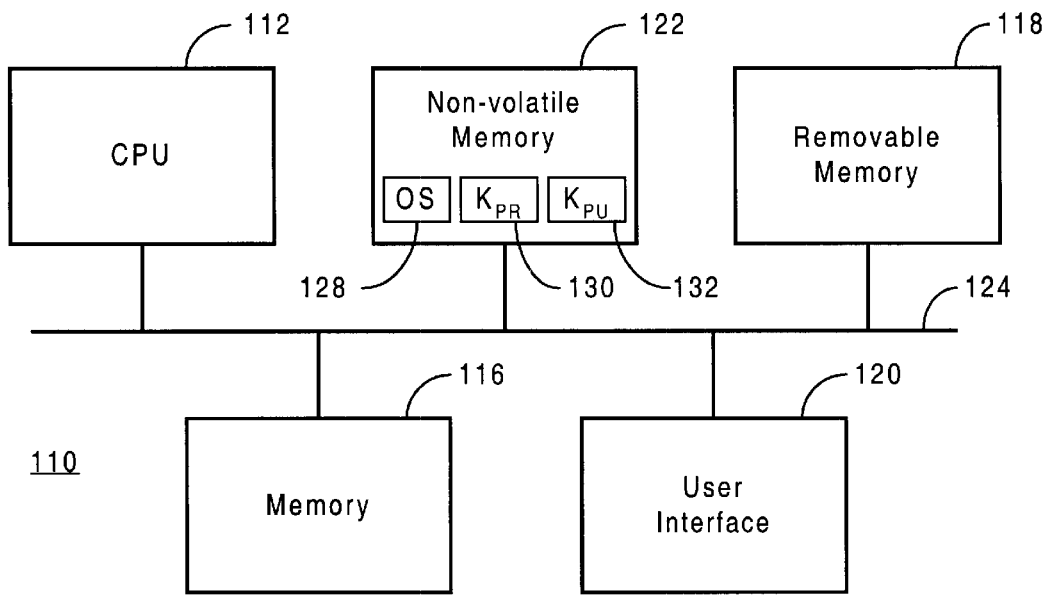
FIG. 2 is a block diagram showing one preferred embodiment of a portable electronic device for use in accordance with the present invention.

Referring now to FIG. 2, a block diagram of one preferred embodiment of a portable electronic device 110 is shown for use in accordance with the present invention. The portable electronic device 110 preferably includes a central processing unit (CPU) 112, a memory 116, a removable memory 118, a user interface 120, and a non-volatile memory 122. Each element of portable electronic device 110 communicates through a common system bus 124. Extra storage for the portable electronic device 110 is typically provided by inserting a removable memory 118 into the portable electronic device 110.

In a preferred embodiment, electronic device 110 is a small-sized, portable electronic device 10, such as a digital camera or a personal digital assistant (PDA). In other embodiments, electronic device 110 may alternately be implemented as any type and size of electronic device or system that includes or utilizes a removable memory 118.

CPU 112 is preferably a microprocessor for running various software routines. Although CPU 122 is preferably a microprocessor, one or more DSP's (digital signal processor) or ASIC's (Application Specific Integrated Circuit) could also be used. Memory 118 may alternately comprise various storage device configurations, such as a random-access memory (RAM).

Non-volatile memory 122 preferably comprises an Electrically Erasable Programmable Read Only Memory (EEPROM), but may also comprise a conventional read-only memory, or a flash memory. Non-volatile memory 122 typically stores an operating system program 128, which when executed by CPU 112, controls the operation of the portable electronic. In the case where the portable electronic device comprises a digital camera, an example of the operating system 128 is the Digita™ Operating Environment provided by the assignee of the present application.

Removable memory 118 serves as an additional image data storage area and is preferably a non-volatile device, such a flash disk, readily removable and replaceable by the user via removable memory slot (not shown).

As stated previously, smart cards provide a secure way to store asymmetrical cryptography and keys, since the user's private key is stored on the smart card and his/her public key is stored on the device. However, smart cards typically require a smart card reader that is too bulky to include in today's portable electronic devices.

In one aspect of the present invention, both the user's private key 130 and public key 132 are stored in non-volatile memory 122 in the portable electronic device 110, as shown, and are accessible via the device's operating system 128. To more particularly describe the features of the present invention, refer now to FIGS. 3 and 4.

Figure 3:
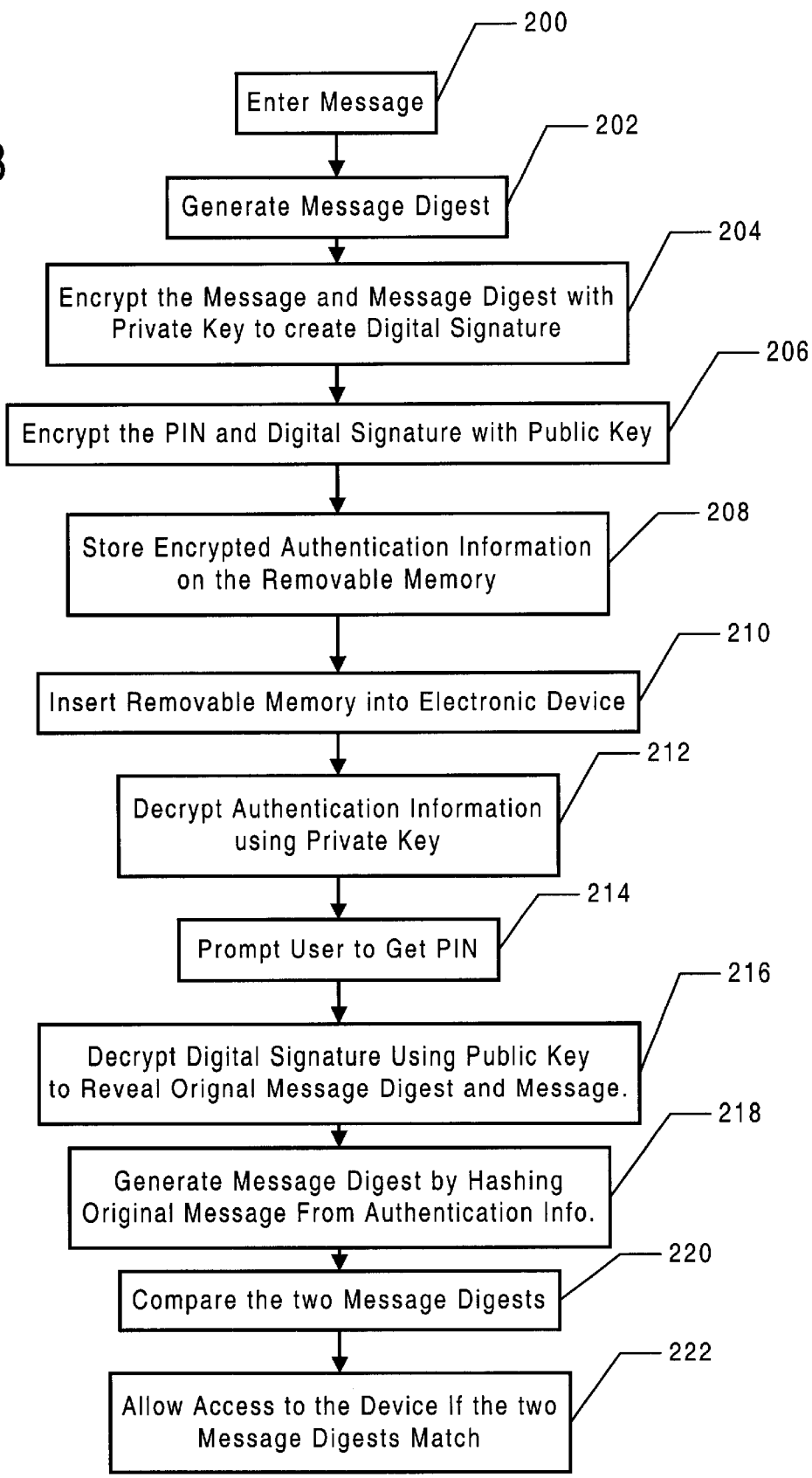
FIG. 3 is a flowchart depicting the process of user authentication in a portable electronic device without the use of a smart card or card reader in accordance with the present invention.
Figure 4:
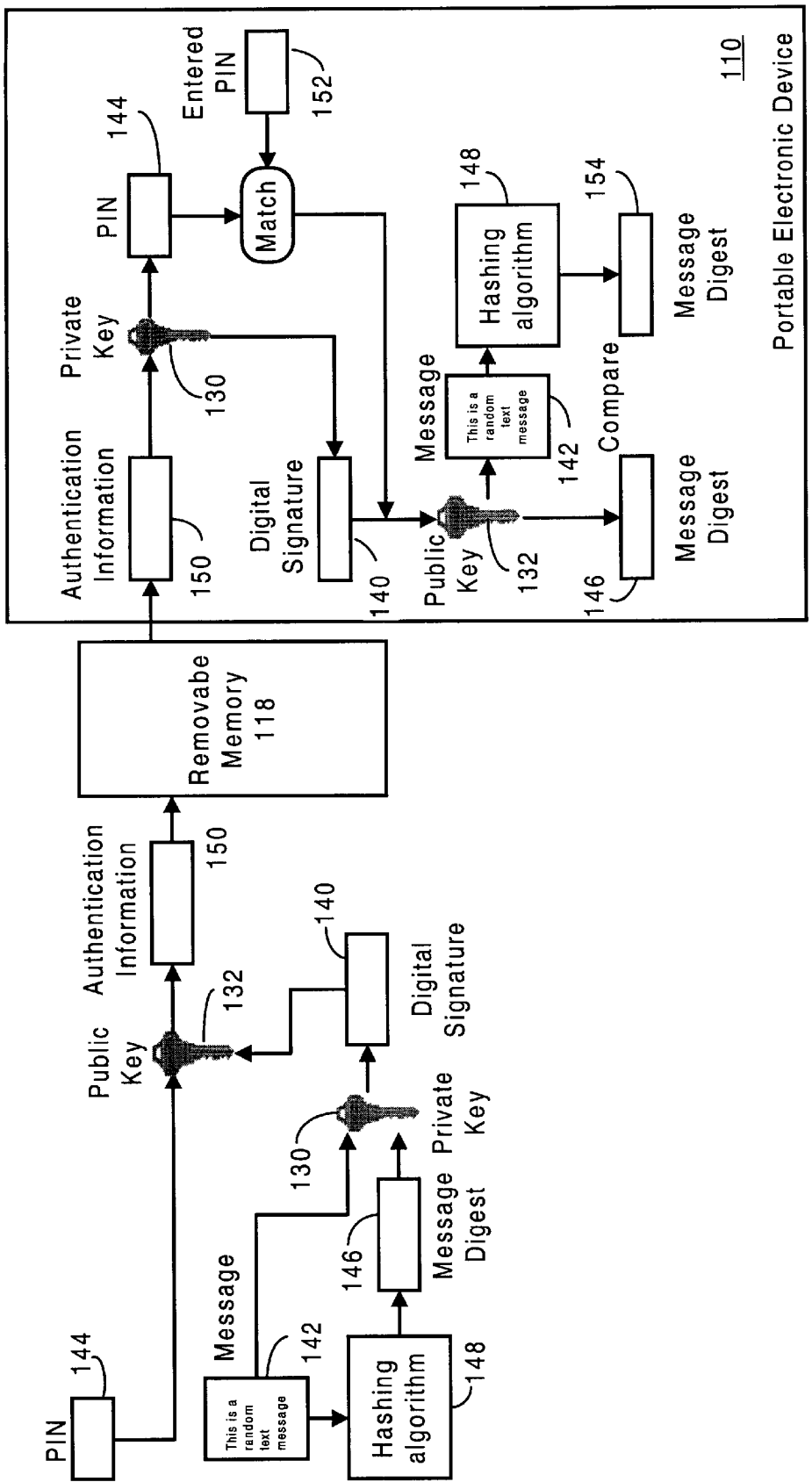
FIG. 4 is a block diagram graphically illustrating the process described in FIG. 3.

FIG. 3 is a flowchart depicting the process of authenticating the user of a portable electronic device without the use of a smart card or card reader in accordance with the present invention. FIG. 4 is a block diagram graphically illustrating the steps described in FIG. 3.

The process begins by creating a digital signature 140. As described above, the user enters a message 142 on a PC or other computing device in step 200. The message 142 may comprise anything from the user's name and for PIN to random text, although stronger protection will result from a longer message 142. A message digest 146 is then generated by hashing the message 142 using a standard hashing algorithm 148 in step 202. After the message digest 146 is generated, it is encrypted (signed) along with the message 142 using the user's private key 130 in step 204.

There are several alternative preferred embodiments to the present invention.

The digital signature 140 could be generated by encrypting the message digest 146 with the PIN 140 and/or the message 142 using the user's private key 130. The preferred embodiment encrypts the message 142 with the message digest 146 because it simulates the use of a smart card more closely. Encrypting all three would be the most secure alternative. The other choices not described in detail modify the given algorithm only slightly and in ways that are obvious to one of ordinary skill in the art.

After the digital signature 140 is generated, the user's public key 132 is used to encrypt his/her PIN 140 with the digital signature 140 to create encrypted authentication information 150 in step 206. This encrypted authentication information 150 is then stored on the removable memory 118 in step 208.

To unlock the portable electronic device 110, the removable memory 118 is inserted into the portable electronic device 110 in step 210. Upon detection of the removable memory 118, the portable electronic device's operating system 128 searches for the authentication information 150 on the removable memory 118. If the authentication information 150 is found, the portable electronic device 110 uses the private key 130 stored on the portable electronic device 110 to decrypt the authentication information 150 in step 212. Only the owner's private key 130 can decrypt the authentication information 150 properly.

Once the information is decrypted, the user is prompted for a PIN, and the user enters the PIN 152 on the user interface 120 of the portable electronic device 110 in step 214. If the PIN 152 entered by the user matches the PIN 144 from the decrypted authentication information 150, the operating system 128 or other program uses the user's public key 132 to decrypt the digital signature 140 to obtain the original message 142 and message digest 146 in step 216. Another message digest 154 is generated in step 218 by hashing the message 142 obtained in step 216 using the same hashing algorithm 148 used in step 202.

The two message digests 146 and 154 are then compared in step 220. If they match in step 222, the user is authenticated and access to the portable electronic device 110 is allowed.

The present invention thus provides the same level of security as a smart card, but without the use of a smart card or smart card reader. Moreover, the user's digital certificate is not at risk, if the removable media is lost or stolen, because it is useless without the PIN.

Those with ordinary skill in the art will appreciate that the user could generate their own authentication information using software on their PC's, or the authentication information could be generated by a third party as a service to customers (e.g., on a walk-in basis for any customer with a PC smart card, or via the Internet).

In summary, a method and system for authenticating users of portable electronic devices using cryptography has been disclosed. Although the present invention has been described in accordance with the embodiments shown, one of ordinary skill in the art will readily recognize that there could be variations to the embodiments and those variations would be within the spirit and scope of the present invention. In addition, software written according to the present invention may be stored on a computer readable medium, such as the removable memory, or transmitted over a network, and loaded into the portable electronic device for execution. Accordingly, many modifications may be made by one of ordinary skill in the art without departing from the spirit and scope of the appended claims.

What is claimed is:

1. A method for authenticating a user of a portable electronic device having a removable memory using asymmetric cryptography, the asymmetric cryptography requiring the use of a user's private key and public key, the method comprising the steps of:

(a) storing the user's private key and public key in the portable electronic device;

(b) encrypting information including the user's personal identification number (PIN) using the user's private key and public key, respectively, to create encrypted authentication information, and
   (i) hashing a message to create a message digest,
   (ii) using the private key to encrypt the message digest and the message to create a digital signature, and
   (ii) encrypting the PIN and the digital signature using the user's public key;

(c) storing the encrypted authentication information on the removable memory;

(d) in response to the removable memory being inserted into the portable electronic device, decrypting the encrypted authentication information using the user's private key and public key, respectively, and prompting the user to enter a new PIN; and (e) allowing access to the portable electronic device if the decrypted authentication information and the new PIN are verified, whereby the user is authenticated without the need of a smart card and smart card reader.

2. A method as in claim 1 wherein step 1(d) further includes the step of:

(i) decrypting the encrypted authentication information using the private key to reveal the PIN and digital signature.

3. A method as in claim 2 wherein step 1(e) further includes the steps of:

(i) verifying that the PIN from the decrypted authentication information matches the new PIN;

(ii) in response to a match, using the public key to decrypt the digital signature to reveal the message and message digest;

(iii) hashing the message to create a new message digest; and (iv) authenticating the user if the message digest from the digital signature matches the new message digest.

4. A system for authenticating a user of for a portable electronic device, comprising:

a random access memory;

a non-volatile memory for storing an operating system program, a first cryptographic key and second cryptographic key;

a removable memory removably inserted into the portable electronic device, the removable memory storing encrypted authentication information, the encrypted authentication information including a personal identification number (PIN) and a digital signature; and a processor coupled to the random access memory, the non-volatile memory, and to the memory for executing the operating system program, the operating system program responsive to the presence of the encrypted authentication information to decrypt the authentication information using the first and second cryptographic keys to reveal the PIN and the digital signature, and to prompt the user to enter a new PIN, wherein access to the portable electronic device is allowed if the decrypted authentication information and the new PIN are verified, whereby the user is authenticated without the need of a smart card and smart card reader.

5. A system as in claim 4 wherein the operating system compares the PIN and the new PIN, and in response to a match, decrypts the digital signature using the second cryptographic key to reveal the message and the message digest, hashes the message to create a new message digest, and authenticates the user if the message digest from the digital signature matches the new message digest.

6. A system as in claim 5 wherein the first cryptographic key is a private keys and the second cryptographic key is a public key.

7. A computer-readable medium containing program instructions for authenticating a user of a portable electronic device having a removable memory using asymmetric cryptography, the asymmetric cryptography requiring the use of a user's private key and public key, the program instructions of:

(a) storing the user's private key and public key in the portable electronic device (b) encrypting information including the user's personal identification number (PIN) using the user's private key and public key, respectively, to create encrypted authentication information, and
 (i) hashing a message to create a message digest,
 (ii) using the private key to encrypt the message digest and the message to create a digital signature, and
 (iii) encrypting the PIN and the digital signature using the user's public key;

(c) storing the encrypted authentication information on the removable memory;

(d) in response to the removable memory being inserted into the portable electronic device, decrypting the encrypted authentication information using the user's private key and public key, respectively, and prompting the user to enter a new PIN; and (e) allowing access to the portable electronic device if the decrypted authentication information and the new PIN are verified, whereby the user is authenticated without the need of a smart card and smart card reader.

8. A computer-readable medium as in claim 7 wherein instruction 13(d) further includes the instruction of:
 (i) decrypting the encrypted authentication information using the private key to reveal the PIN and digital signature.

9. A computer-readable medium as in claim 8 wherein instruction 13(e) further includes the instructions of:
 (i) verifying that the PIN from authentication information matches the new PIN;
 (ii) in response to a match, using the public key to decrypt the digital signature to reveal the message and message digest;
 (iii) hashing the message to create a new message digest; and
 (iv) authenticating the user if the message digest from the digital signature matches the new message digest.

10. A method for authenticating the user of a portable electronic device having a removable memory using asymmetric cryptography, the asymmetric cryptography requiring the use of a user's private key and public key, the method comprising the steps of:

(a) encrypting a user's authentication information twice using the user's private key and public key, respectively, to create encrypted authentication information;

(b) storing the encrypted authentication information on the removable memory;

(c) storing the user's private key and public key in the portable electronic device;

(d) using the user's private key and public key, respectively, to decrypt the twice encrypted authentication information when the removable memory is inserted into the portable electronic device; and (e) using the decrypted authentication information to authenticate the user, whereby the user is authenticated without the need of a smart card and smart card reader.

11. The method of claim 10 further including the step of:
using a personal identification number (PIN) as the authentication information.

\* \* \* \* \*